United States Patent Office 3,502,744
Patented Mar. 24, 1970

3,502,744
ANTISTATIC MOLDING COMPOSITIONS BASED ON THERMOPLASTIC GRAFT COPOLYMER MIXTURES
Hans Weitzel and Harold Ebneth, Leverkusen, Karl Dinges, Odenthal, and Karl-Heinz Ott, Cologne-Stammheim, Germany, assignors to Farbenfabriken Bayer Aktiengesellschaft, Leverkusen, Germany, a corporation of Germany
No Drawing. Filed Jan. 27, 1967, Ser. No. 612,084
Claims priority, application Germany, Mar. 5, 1966, F 48,594
Int. Cl. C08f 19/10
U.S. Cl. 260—876
6 Claims

ABSTRACT OF THE DISCLOSURE

Antistatic moulding compositions comprising (A) a graft copolymer of a mixture of styrene and acrylonitrile or akyl derivatives thereof grafted onto a diolefin polymer (B) optionally a copolymer of styrene and acrylonitrile or alkyl derivatives thereof (C) graft polymers of a copolymer of a diene and an ester of an ethylenically unsaturated carboxylic acid as the graft base and a mixture of styrene and acrylonitrile or alkyl derivatives thereof as graft component and (D) polypropylene glycols whose terminal hydroxyl groups are optionally etherified or esterified.

---

This invention relates to moulding compositions based on thermoplastic graft copolymer mixture exhibiting outstanding antistatic properties.

One advantage of conventional thermoplastic moulding compositions based on graft copolymer mixtures of butadiene, esters of acrylic or methacrylic acid, styrene and acrylonitrile, is that they combine high impact and notched impact strength with outstanding hardness and tensile strength. Unfortunately, these materials which are known per se have an extremely high electrical surface resistance which greatly impairs their electrostatic behaviour. For example, consumer goods produced from these moulding compositions very rapidly attract dust and for this reason are unsuitable for many applications.

Various processes have already been developed with a view to avoiding or at least reducing the electrostatic charging of some thermoplastic moulding compositions e.g. cellulose acetate and cellulose propionate. Mouldings produced from these materials are exposed to air saturated with moisture. The absorption of a certain amount of water vapour reduces the surface resistance of these mouldings to such an extent that they do not attract dust or become soiled. Unfortunately on standing in dry air, the mouldings very quickly lose their water content and their initially outstanding antistatic properties.

An alternative method of reducing electrostatic charging, used for example in polyolefins, comprises treating the surface of the mouldings with antistatic agents to develop a conductive film which prevents electrostatic charging. However such a film is very quickly rubbed or worn off in use and the antistatic agent used is very often extremely hygroscopic causing an impaired surface of the moulding. These antistatic agents are furthermore often physiologically unacceptable.

It has further been proposed to introduce compounds with an antistatic effect such as amines, amides, salts of quaternary bases, sulphonic acids, aryl-alkyl sulphonates, phosphoric acids, aryl-alkyl phosphates, polyglycols and their derivatives, fatty acid esters of polyglycols, aryl and alkyl ethers of polyglycols and polyalcohols into the thermoplastic moulding compositions before they are processed. In order to obtain an adequate antistatic effect, these compounds had to be incorporated in high quantities, so that the mechanical properties of the mouldings produced from them were no longer satisfactory, i.e. considerable decreases in hardness, stiffness and thermal stability under stress, were unavoidable.

The antistatic effect of all these conventional antistatic substances is ultimately dependent upon the development of a film of moisture on the surface of the moulding, which improves surface conductivity.

According to French patent specification No. 1,250,926, polyalkylene glycols with a molecular weight of between 200 and 1,200, are added as antistatic agents to mouldings produced from polyolefins in order to prevent electrostatic charging. Unfortunately, the effect of the polyalkylene glycols used, which are added in a concentration of between 0.01 and 0.5% by weight, is only adequate when their solubility in water amounts to at least 0.5 g. per 100 g. of water. However, moulding compositions whose electrostatic charging is reduced by the addition of such water-soluble polyalkylene glycols developing a water film on their surface, lose their antistatic properties where the mouldings produced from them are in prolonged contact with water or moisture, as is frequently the case in practice. From Belgian patent specification No. 650,391 it is known to produce mouldable plastics exhibiting good antistatic properties by incorporating polypropylene glycols, which are almost insoluble in water, into graft copolymer mixtures of elastomeric graft polymers of styrene and acrylonitrile on polybutadiene, and thermoplastic copolymers based on styrene-acrylonitrile.

It is an object of this invention to produce moulding compositions of graft polymers comprising styrene and acrylonitrile or their respective alkyl derivatives grafted onto an elastomeric polymer of a conjugated diolefin, wherein actually only part of the styrene and acrylonitrile or their alkyl derivatives has to be grafted and the remainder, if any, is in the form of an admixed copolymer which exhibit improved antistatic properties.

A further object is antistatic moulding compositions complying to the above definition.

Generally speaking, these objects are achieved by admixing to said moulding compositions an appropriate quantity of a synergistic mixture of:

(a) Graft polymers of a copolymer of a diene and an ester of an ethylenically unsaturated carboxylic acid as the graft base, and a mixture of styrene and acrylonitrile or alkyl derivatives thereof as graft component, and (b) Polypropylene glycols whose terminal hydroxyl groups are optionally etherified or esterified.

Dienes particularly suitable for the preparation of the aforementioned graft polymers include in particular butadiene and isoprene, although other dienes can also be used.

Esters of ethylenically unsaturated carboxylic acids suitable for preparing the graft base include in particular esters of acrylic acid, methacrylic acid and/or fumaric acid. The ester preferably contains an aliphatic monohydric alcohol having 1 to 10 carbon atoms as the alcohol moiety.

Suitable polypropylene glycols which, in combination with the graft polymers, have a synergistic effect are polypropylene glycols which are almost insoluble in water or ethers or esters derived from them, the degree of polymerisation of these compounds being from 10 to 1,000, preferably from 15 to 200. Preferred ester and ether components include aliphatic carboxylic acids with 1 to 18 carbon atoms and alcohols with 1 to 20 carbon atoms.

The antistatic activity of these substances is apparently not based on the development of a film of water on the surface of a moulding produced from the composition, as with other antistatic additives. Even when the mouldings are stored in water, the antistatic additives used according to the invention do not lose their effect as apparently they are not dissolved out by virtue of their insolubility.

Preferred thermoplastic moulding compositions with outstanding antistatic properties are obtained from (A) 5 to 98% by weight and preferably 5 to 60% by weight of a graft copolymer prepared by the graft polymerisation of (a) 10 to 95% by weight and preferably 10 to 80% by weight of a mixture of (i) 50 to 90% by weight of styrene, and
(ii) 50 to 10% by weight of acrylonitrile wherein either of these two components may be replaced either completely or in part by their respective alkyl derivatives, on (b) 90 to 5% by weight and preferably 90 to 20% by weight of a polymer of a conjugated diolefin containing at least 80% by weight of polymerised diolefin and at most 20% of styrene and/or acrylonitrile or alkyl derivatives thereof, and (B) 0 to 93% by weight and preferably 10 to 91% by weight of a thermoplastic copolymer of (a) 50 to 95% by weight of styrene and
(b) 50 to 5% by weight of acrylonitrile which may be partly or totally replaced by the respective alkyl derivatives of these two monomer components, the total amount of acrylonitrile and styrene or their alkyl derivatives in components A, B and C not being less than 50% by weight, and (C) 1 to 35% by weight of a graft copolymer prepared by the graft polymerisation of (a) 10 to 90% by weight and preferably 20 to 80% by weight of a mixture of (i) 50 to 90% by weight of styrene, and
(ii) 50 to 10% by weight of acrylonitrile, wherein either of these two components may be replaced either completely or in part by their respective alkyl derivatives, on (b) 90 to 10% by weight and preferably 80 to 20% by weight of a copolymer of (i) 90 to 5% by weight and preferably 85 to 15% by weight of a conjugated diolefin and
(ii) 10 to 95% by weight and preferably 50 to 85% by weight of an ester of an ethylenically unsaturated carboxylic acid and (D) 1 to 10% by weight of a polypropylene glycol whose degree of polymerisation is from 10 to 1000 and whose terminal OH-group can be completely or partly etherified or esterified.

It is apparent from the foregoing that the resin-forming monomers for example styrene and acrylonitrile are preferably partly blended with the graft polymer components A and C in the form of a copolymer B. The preferred ratio of grafted to mixed styrene-acrylonitrile is indicated above. It is in principle also possible to graft all the resin-forming monomers on to the graft bases from the outset, in which case there would be no need for a special mixing step involving a resin-copolymer component B (as is also apparent from the condition that the total amount of acrylonitrile and styrene in the components A, B and C must not be less than 50% by weight).

According to a preferred embodiment of the invention, the graft base of the aforementioned graft copolymer component A, the polymer of a diolefin containing at least 80% of conjugated diolefin, is a butadiene homopolymer.

According to a modification of the invention, polybutadiene can be replaced as the graft base for the preparation of graft copolymer A by copolymers of conjugated diolefins in admixture with one another, for example copolymers of butadiene with isoprene and other 1,3-dienes, or by copolymers of conjugated diolefins containing up to 20% of another copolymerisable monovinyl compound for example, styrene and/or acrylonitrile, esters of ethylenically unsaturated carboxylic acids not being included in the copolymerisable monovinyl compounds. Polymers with a butadiene content of at least 80% and a gel content, i.e., a toluene insoluble portion, of more than 80%, are of particular interest as the graft base. The styrene and/or acrylonitrile to be grafted can even be completely or partly replaced by alkyl derivatives of these compounds, α-methylstyrene in particular or nuclear-alkylated (alkyl from $C_1$ to $C_6$) styrenes or methacrylonitrile.

According to another preferred embodiment of the invention, a thermoplastic copolymer of styrene and acrylonitrile with a K-value [according to Fikentscher, Cellulose-Chemie 13 (1932), 58] of at least 40 and preferably from 55 to 80, is used as copolymer component B.

Similarly, styrene and acrylonitrile may be completely or partly replaced in the thermoplastic copolymer component B by alkyl derivatives of these components, in particular α-methylstyrene and/or nuclear-alkylated (alkyl $C_1$–$C_6$) styrene or methacrylonitrile. Thermoplastic copolymers of 95 to 60% by weight of styrene and 5 to 40% by weight of acrylonitrile, in which case the styrene can be completely replaced by α-methylstyrene, are of particular interest in this respect.

According to still another preferred embodiment of the invention, the graft base of graft polymer component C, i.e., the copolymer of a conjugated diolefin with an ester of an ethylenically unsaturated carboxylic acid, is a butadiene/acrylic ester or methacrylic ester copolymer.

According to a further modification of the invention, mixtures of butadiene with isoprene and other 1,3-dienes can be used in place of butadiene itself in the preparation of the graft base for graft polymer C. According to a preferred embodiment, the acrylic esters or methacrylic esters of the graft polymer C are esters of acrylic acid or methacrylic acid with alcohols containing 1 to 10 carbon atoms, and may be used either individually or in admixture with one another.

According to yet another modification of the invention, the acrylic or methacrylic ester of the graft base of graft polymer C can be partly or completely replaced by esters of fumaric acid with alcohols containing 1 to 10 carbon atoms. It is even possible to use fairly small quantities of a cross-linking monomer, for example divinyl benzene, ethyleneglycol diacrylate, butanediol diacrylate and other monovinyl compounds which can be radically polymerised in admixture with butadiene and the acrylic, methacrylic and/or fumaric acid esters, for example styrene, acrylonitrile, methacrylic acid and methyl vinyl ether, during polymerisation of the butadiene with the acrylic, methacrylic and/or fumaric acid esters to prepare the graft base of graft polymer C.

The styrene and acrylonitrile to be grafted on to the graft base of graft polymer C, can be completely or partly replaced by alkyl derivatives of these compounds, in particular α-methyl styrene or nuclear-alkylated styrene (alkyl $C_1$ to $C_6$) or methacrylonitrile.

Polypropylene glycols with a degree of polymerisation from 10 to 1000 are used as component D for the purposes of this invention. The terminal OH-groups of these polypropylene glycols can be completely or partly etherified or esterified, e.g. with alcohols containing 1 to 20 carbon atoms and respectively monocarboxylic acids with 1 to 18 carbon atoms. Linear or branched polypropylene glycols and polypropylene glycols whose polypropylene glycol chain is interrupted by ester or urethane groups, may be used. According to a preferred embodiment of the present invention, completely linear polypropylene glycols with a degree of polymerisation from 10 to 200, are used as component D.

Components A and C can be prepared as known per se by polymerising the monomers to be grafted in the presence of the graft base, either in emulsion, suspension or in solution. It is of advantage to carry out graft polymerisation in emulsion if the corresponding graft base is in emulsion form.

The graft bases for components A and C may also be prepared, as known per se, by emulsion or solution polymerisation. Polymerisation is with advantage carried out in emulsion.

Basically, the emulsifiers, regulators, polymerisation catalysts and electrolytes, described herein in connection with the preparation of copolymer component B, may be used, within the limits specified, in the preparation both of the graft bases for graft polymer components A and C, and of the graft polymer components A and C themselves.

The thermoplastic copolymer component B may also be prepared, as known per se, by emulsion suspension, solution or precipitation polymerisation. Component B is also preferably polymerised in aqueous emulsion, the usual quantities of water, emulsifiers, regulators, polymerisation catalysts, pH-regulators and other additives being used. For example, the monomer or polymer concentration can be from 20 to 50%, i.e. 400 to 100 parts by weight of water can be used per 100 parts by weight of monomer.

The following are examples of suitable emulsifiers: sodium, potassium or ammonium salts of long-chain fatty acids containing 10 to 20 carbon atoms, alkyl sulphates containing 10 to 20 carbon atoms, alkyl sulphonates with 10 to 20 carbon atoms alkylaryl sulphonates containing 10 to 20 carbon atoms, resin acids (for example derivatives of abietic acid), and reaction products of ethylene oxide with long-chain fatty alcohols or phenols. It is preferred to use emulsifiers which are deprived of their emulsifying action below pH 7 by the formation of the free acids.

Long-chain mercaptans such as dodecyl mercaptan for example, may be used as molecular weight regulators and hence for establishing the required K-value.

Suitable polymerisation catalysts include inorganic or organic peroxy compounds or azo compounds, for example, potassium or ammonium persulphate, tert.-butyl hydroperoxide, cumene hydroperoxide, benzoyl peroxide, tert.-butyl perbenzoate, isopropyl percarbonate, or azodiisobutyronitrile. It is also possible to use Redox systems comprising the aforementioned peroxy compounds and reducing agents, for example, sodium pyrosulphite or bisulphite, sodium formaldehyde sulphoxylate, triethanolamine or tetraethylene pentamine. Salts of orthophosphoric acid or pyrophosphoric acid may, for example, be used as pH-regulators. Polymerisation can be carried at pH-values from 2 to 11 and at temperatures in the range from 20 to 100° C., preferably in the range from 40 to 90° C.

In principle, the polypropylene glycols can be added to the graft polymer component A and C and to the copolymer component B, to be used in accordance with the invention, in different ways:

(1) The polypropylene glycol can be mixed with the coagulate of the latex mixture of components A, B and C. In this case the polyether itself is absorbed fairly effectively in the presence of water.

(2) The polypropylene glycols can be worked into a dry powder of the polymer mixture, preferably along with pigments, by means of suitable mixing units such as single and twin-screw extruders or Banbury mixers.

(3) According to a preferred embodiment of the invention, an emulsion of the polypropylene glycol (as explained below) is mixed with the mixture of the latices of components A, B and C, preferably at room temperature, and the resulting mixture is coagulated as known per se. It has proved to be of particular advantage to use ultra-finely divided polypropylene glycol emulsions.

The polypropylene glycol emulsion can be prepared by stirring the appropriate poyether into an aqueous emulsifier solution by means of a high-speed stirrer. Preferably 0.5 to 2 parts by weight of water are used per part by weight of polyether. The emulsifiers used in the preparation of the graft polymers and of the styrene-acrylonitrile copolymer (see above) may be used as emulsifiers for the polypropylene glycol emulsion in quantities from 0.5 to 5% by weight, based on the polypropylene glycol.

The mixtures can be coagulated by methods known per se, for example by mixing the latex/polyether mixture with electrolytes, organic salts and acids in particular, and optionally heating the resulting mixture at elevated temperature. The type of coagulant to be used will depend upon the type of emulsifiers present in the mixture. Electrolytes such as sodium chloride, calcium chloride, magnesium sulphate or aluminium sulphate are used in the case of emulsifiers which are active both in the acid and in the alkaline range (alkyl sulphates, alkyl sulphonates and alkyl-aryl sulphonates). In the case of emulsifiers which are deprived of their action in the acid range, it is sufficient for coagulation to add an acid for example hydrochloric acid or acetic acid.

It is even possible to produce coagulation by cooling the mixture to temperatures below 0° C. ("freezing out").

The coagulates are worked up by methods similar to those known per se which are used to work up coagulates of thermoplastic copolymer mixtures; for example the coagulates can be separated, washed until they are free of electrolyte and neutral and dried at a temperature below 100° C., preferably in vacuo.

The dried material is then consolidated and homogenised on mixing rolls, in kneaders or similar machinery, at temperatures in the range from 130° C. to 180° C., and, if desired, subsequently granulated. The resulting compact and at the same time heat- and light-stabilised compositions can be shaped on the conventional forming machines, for example injection-moulding machines or extruders. Conventional fillers, pigments and lubricants, such as stearates or waxes, may be incorporated in the thermoplastic moulding compositions of this invention.

The moulding compositions produced in accordance with the invention are distinguished by their outstanding antistatic properties. This was all the more surprising insofar as no improvement, or no comparable improvement, in the antistatic behaviour of graft polymers of styrene and acrylonitrile on elastomeric polymers of conjugated diolefins, or of mixtures of these graft polymers with styrene/acrylonitrile copolymers, can be obtained by using the individual components C or D of the synergistic mixture.

The parts and percentages indicated in the following examples are parts and percentages by weight unless otherwise stated.

EXAMPLE 1

1395 g. of a 28.7% latex of a graft polymer (graft polymer component A) of 36 parts of styrene and 14 parts of acrylonitrile on 50 parts of a butadiene homopolymer and 6100 g. of a 42.6% latex of a copolymer of 72 parts of styrene and 28 parts of acrylonitrile with a K-value of 61.2 are mixed with 2995 g. of a 33.4% latex of a graft polymer (graft polymer component C) of 22 parts of styrene and 8 parts of acrylonitrile on 70 parts of a copolymer of 50% of butadiene and 50% of butyl acrylate and 667 g. of a 30% emulsion of a linear polypropylene glycol with an average degree of polymerisation of $37 \pm 2$ and an OH-number of $56 \pm 3$. The weight ratio of graft polymer A:resin:graft polymer C:polyether is thus 10:65:25:5. The resulting polymer-polyether mixture is coagulated with a 2% magnesium sulphate solution, the coagulate is separated, washed free of salts and dried in vacuo at 70–80° C.

The dried material is consolidated and homogenised on mixing rolls heated at 165° C., drawn into strips and granulated in a beater mill. Circular discs are injection-moulded from the resulting granulate and found to exhibit the data set out in Table 1.

corded by means of a Schwenkhagen field-intensity meter. The friction partners are fabrics which are closed to the negative or positive end of the triboelectric contact series, for example fabrics of polycaprolactam or polyacrylonitrile.

To avoid errors in measurement through the transfer of material from the friction partner to the test specimen, a new specimen is used for each measurement.

The following measurements were taken:

(A) The intensity of the charge after a fixed number of rubbing strokes (rubbing time 30 seconds).

(B) The limit towards which the charge moves on prolonged rubbing (limiting charge).

(C) The time in which the charge fell to half its original intensity on completion of rubbing (half-life).

All measurements were carried out after adequate con-

TABLE 1.—COMPARISON BETWEEN A POLYMER-POLYETHER MIXTURE ACCORDING TO THE INVENTION AND MIXTURES CONTAINING ONLY ONE COMPONENT OF THE SYNERGISTIC COMBINATION

|  | Graft polymer A | Copolymer | Graft polymer C | Polyether | Surface resistance, $\Omega$ | Friction partner polycaprolactam | | Friction partner polyacrylonitrile | |
| --- | --- | --- | --- | --- | --- | --- | --- | --- | --- |
|  |  |  |  |  |  | Limiting charge, V. cm.$^{-1}$ | Half-life, secs. | Limiting charge, V. cm.$^{-1}$ | Half-life, secs. |
| Example 1 | 10 | 65 | 25 | 5 | $5.10^{12}$ | −600 | 19 | +560 | 25 |
| Comparison Example A | 10 | 65 | 25 |  | $10^{14}$ | −5,800 | 3,200 | +4,700 | 3,000 |
| Comparison Example B | 35 | 65 |  | 5 | $4.10^{13}$ | +1,400 | 550 | +1,600 | 730 |

Comparison of Example 1 according to the invention with Comparison Examples A and B shows very clearly that not only is the half-life greatly reduced, but both the surface resistance and the limit charge are lower.

Comparison Example A 1395 g. of the 28.7% latex of the graft polymer (graft polymer component A) of 36 parts of styrene and 14 parts of acrylonitrile on 50 parts of butadiene homopolymer, and 6100 g. of the 42.6% latex of the copolymer of 72 parts of styrene and 28 parts of acrylonitrile with a K-value of 61.2, are mixed with 2995 g. of a 33.4% latex of the graft polymer (graft polymer component C) of 22 parts of styrene and 8 parts of acrylonitrile on 70 parts of a copolymer of 50% of butadiene and 50% of butyl acrylate, in the absence of polypropylene glycol. The weight ratio of graft polymer A:resin:graft polymer C: polyether is thus 10:65:25:0. The polymer mixture is worked up and further processed as described in Example 1.

The electrical data measured on the circular discs are set out in Table 1.

Comparison Example B 4880 g. of the 28.7% latex of the graft polymer (graft polymer component A) of 36 parts of styrene and 14 parts of acrylonitrile on 50 parts of butadiene homopolymer, and 6110 g. of the 42.6% latex of the copolymer of 72 parts of styrene and 28 parts of acrylonitrile with a K-value of 61.2, are mixed with 667 g. of a 30% emulsion of the linear polypropylene glycol with an average degree of polymerisation of $37 \pm 2$ and an OH-number of $56 \pm 3$. The weight ratio of graft polymer A:resin graft polymer B:polyether is thus 35:65:0:5. The polymer-polyether mixture is worked up and further processed as described in Example 1.

The electrical data measured on the circular discs are set out in Table 1 below.

Explanation of Table 1 and all other tables (1) The surface resistance is measured in accordance with DIN 53482 and VDE 0303. Surface resistance and charge are each measured in the same conditioned test atmosphere. The results indicate the resistance between two 10-cm.-long electrodes mounted at a distance of 1 cm. apart.

(2) The plastics disc to be measured is clamped in a resilient holder by means of a ring. An arm covered with the "friction partner" moves over the disc at a frequency of 1 c./s. The field intensity between the test disc charged by friction, and the measuring head is measured and reditioning in an air-conditioned test cabinet. A specimen of known behaviour is used for comparison.

EXAMPLE 2

1395 g. of the 28.7% latex of the graft polymer (graft polymer component A) of 36 parts of styrene and 14 parts of acrylonitrile on 50 parts of a butadiene homoploymer, and 6100 g. of the 42.6% latex of the copolymer of 72 parts of styrene and 28 parts of acrylonitrile, with a K-value of 61.2, are mixed with 2995 g. of a 33.4% latex of a graft polymer (graft polymer component C) of 14 parts of styrene and 6 parts of acrylonitrile on 80 parts of a copolymer of 50% of butadiene and 50% of ethyl acrylate, and 667 g. of the 30% emulsion of the linear polypropylene glycol with an average degree of polymerisation of $37 \pm 2$ and an OH-number of $56 \pm 3$. The weight ratio of graft polymer A:resin:graft polymer C:polyether is thus 10:65:25:5.

The polymer mixture is worked up and further processed as described in Example 1. The resulting moulding composition shows the electrical data set out in Table 2.

EXAMPLE 3

2370 g. of the 28.7% latex of the graft polymer (graft polymer component A) of 36 parts of styrene and 14 parts of acrylonitrile on 50 parts of a butadiene homopolymer, and 6110 g. of the 42.6% latex of the copolymer of 72 parts of styrene and 28 parts of acrylonitrile with a K-value of 61.2, are mixed with 2215 g. of a 32.5% latex of a graft polymer (graft polymer component C) of 14 parts of styrene and 6 parts of acrylonitrile on 80 parts of a copolymer of 30% of butadiene and 70% of ethylacrylate, and 667 g. of the 30% emulsion of the linear polypropylene glycol with an average degree of polymerisation of $37 \pm 2$ and an OH-number of $56 \pm 3$. The weight ratio of graft polymer A:resin:graft polymer C:polyether is thus 17:65:18:5. The polymer-polyether mixture is worked up as described in Example 1 and further processed into circular discs, again as described in Example 1. The electrical data measured on the circular discs are set out in Table 2 below.

Comparison Example C

As in Example 3, 2370 g. of the 28.7% latex of graft polymer A , 6110 g. of the 42.6% styrene-acrylonitrile copolymer latex and 2215 g. of the 32.5% latex of graft polymer C, are mixed together in the absence of polypropylene glycol. The latex mixture is worked up and further processed into circular discs as described in Example 1. The discs exhibit the electrical data set out in Table 2 below.

of 72 parts of styrene and 28 parts of acrylonitrile are mixed with 3000 g. of a 33.3% latex of a graft polymer (graft polymer component C) of 14 parts of styrene and 6 parts of acrylonitrile on 80 parts of a copolymer of TABLE 2.—COMPARISON BETWEEN POLYMER-POLYETHER MIXTURES ACCORDING TO THE INVENTION AND A MIXTURE IN WHICH NO POLYETHER IS PRESENT

| | Graft polymer A amount | Copolymer component amount | Graft Polymer C | | Poly-ether amount | Surface resistance $\Omega$ | Friction partner polycaprolactam | | Friction partner polyacrylonitrile | |
|---|---|---|---|---|---|---|---|---|---|---|
| | | | Graft base | Amount | | | Limiting charge, V. cm.$^{-1}$ | Half-life, secs. | Limiting charge, V. cm.$^{-1}$ | Half-life, secs. |
| Example 2 | 10 | 65 | 50% butadiene, 50% EA[1] | 25 | 5 | $2.10^{12}$ | +280 | 6 | +330 | 10 |
| Example 3 | 17 | 65 | 30% butadiene, 70% EA[1] | 18 | 5 | $8.10^{12}$ | +530 | 17 | +880 | 25 |
| Comparison Example C | 17 | 65 | do [1] | 18 | | $>10^{14}$ | −3,100 | >3,600 | +3,600 | >3,600 |

[1] EA = ethyl acrylate.

Comparison of Examples 2 and 3 according to the invention with comparison Example C shows very clearly that not only is the half-life period greatly reduced, but also that both the surface resistance and the limit charge are lower.

EXAMPLE 4

1395 g. of the 28.7% latex of the graft polymer (graft polymer component A) of 36 parts of styrene and 14 parts of acrylonitrile on 50 parts of a butadiene homopolymer, and 6575 g. of the 42.6% latex of the copolymer of 72 parts of styrene and 28 parts of acrylonitrile with a K-value of 61.2, are mixed with 2440 g. of a 32.8% latex of a graft polymer (graft polymer component C) of 36 parts of styrene and 14 parts of acrylonitrile on 50 parts of a copolymer of 50% of butadiene and 50% of butyl acrylate and 667 g. of the 30% emulsion of the linear polypropylene glycol with an average degree of polymerisation of 37±2 and an OH-number of 56±3. The weight ratio of graft polymer A:resin:graft polymer C:polyether is thus 10:70:20:5. The mixture thus prepared is coagulated with 2% magnesium sulphate solution, and the coagulate is separated, washed free of salts and dried in vacuo at 70–80° C.

The material which, after drying, is consolidated and homogenised on mixing rolls heated at 165° C., is subsequently granulated and injection-moulded into circular discs which exhibit the electrical data set out in Table 3.

EXAMPLE 5

695 g. of the 28.7% latex of the graft polymer (graft polymer component A) of 36 parts of styrene and 14 parts of acrylonitrile on 50 parts of a butadiene homopolymer, and 6575 g. of the 42.6% latex of the co-polymer of 72 parts of styrene and 28 parts of acrylonitrile with a K-value of 61.2, are mixed with 3185 g. of a 31.4% latex of a graft polymer (graft polymer component C) of 14 parts of styrene and 6 parts of acrylonitrile on 80 parts of a copolymer of 50% of butadiene and 50% of dibutyl fumarate, and 667 g. of the 30% emulsion of the linear polypropylene glycol with an average polymerisation degree of 37±2 and an OH-number of 56±3. The weight ratio of graft polymer A:resin:graft polymer C:polyether is thus 5:70:25:5. The polymer polyether mixture is worked up and further processed as already described. The circular discs exhibit the electrical data set out in Table 3.

EXAMPLE 6

1740 g. of the 28.7% latex of the graft polymer (graft polymer component A) of 36 parts of styrene and 14 parts of acrylonitrile on 50 parts of the butadiene homopolymer, and 5870 g. of the 42.6% latex of the copolymer of 72 parts of styrene and 28 parts of acrylonitrile are mixed with 3000 g. of a 33.3% latex of a graft polymer (graft polymer component C) of 14 parts of styrene and 6 parts of acrylonitrile on 80 parts of a copolymer of 50% of butadiene and 50% of methyl methacrylate, and 667 g. of the 30% emulsion of the linear polypropylene glycol with an average polymerisation degree of 37±2 and an OH-number of 56±3.

The weight ratio of graft polymer A:resin:graft polymer C:polyether is thus 12:5:62:5:25:5. The mixture is worked up and further processed as already described.

The circular discs exhibit the electrical data set out in Table 4.

EXAMPLES 7, 8, 9

If the linear polypropylene glycol with an average degree of polymerisation of 37 used in Example 6 is replaced by branched polypropylene glycols of the following composition:

| Example | Degree of polymerisation | OH-number |
|---|---|---|
| 7 | 42±2 | 56±3 |
| 8 | 52±3 | 56±3 |
| 9 | 70±4 | 42±3 | and if the polymer-polyether mixture is processed as already described, the electrical data set out in Table 4 are obtained.

EXAMPLES 10 AND 11

If the linear polypropylene glycol with an average degree of polymerisation of 37 used in Example 6 is replaced by etherified or esterified linear polypropylene glycols of the following composition:

Example 10.—Polypropylene glycol monomethyl ether with an average degree of polymerisation of 36±2 and an OH-number of 28±2;

Example 11.—Polypropylene glycol diacetate with an average degree of polymerisation of 30±2 and an OH-number of approximately 0;

and if the polymer-polyether mixture is processed as already described, the electrical data set out in Table 4 are obtained.

TABLE 3

| | Graft polymer A | Co-polymer | Graft polymer C | Poly-ether | Surface resistance, $\Omega$ | Friction partner polycaprolactam | | Friction partner polyacrylonitrile | |
|---|---|---|---|---|---|---|---|---|---|
| | | | | | | Limiting charge, V. cm.$^{-1}$ | Half-life, secs. | Limiting charge, V. cm.$^{-1}$ | Half-life, secs. |
| Example 4 | 10 | 70 | 20 | 5 | $7.10^{12}$ | +360 | 12 | +480 | 27 |
| Example 5 | 5 | 70 | 25 | 5 | $5.10^{12}$ | −570 | 18 | +490 | 31 |

TABLE 4

| | Graft polymer A amount | Copolymer amount | Graft polymer C amount | Polyether PD[1] | Polyether OH | Polyether Amount | Surface resistance, Ω | Friction partner polycaprolactam Limiting charge, V. cm.$^{-1}$ | Friction partner polycaprolactam Half-life, secs. | Friction partner polyacrylonitrile Limiting charge, V. cm.$^{-1}$ | Friction partner polyacrylonitrile Half-life, secs. |
|---|---|---|---|---|---|---|---|---|---|---|---|
| Example 6 | 12.5 | 62.5 | 25 | 37 | 56 | 5 | 6.10$^{12}$ | +210 | 5 | +590 | 25 |
| Example 7 | 12.5 | 62.5 | 25 | 42 | 56 | 5 | 9.10$^{12}$ | +490 | 37 | +1,150 | 58 |
| Example 8 | 12.5 | 62.5 | 25 | 52 | 56 | 5 | 8.10$^{13}$ | −940 | 29 | +820 | 41 |
| Example 9 | 12.5 | 62.5 | 25 | 70 | 42 | 5 | 1.10$^{13}$ | +690 | 44 | +1,300 | 60 |
| Example 10 | 12.5 | 62.5 | 25 | 36 | 28 | 5 | 9.10$^{12}$ | −430 | 34 | +780 | 37 |
| Example 11 | 12.5 | 62.5 | 25 | 30 | 0 | 5 | 2.10$^{13}$ | +800 | 81 | +1,060 | 95 |

[1] PD = degree of polymerisation.

EXAMPLE 12

1120 g. of the 28.7% latex of the graft polymer (graft polymer A) of 36 parts of styrene and 14 parts of acrylonitrile on 50 parts of a butadiene homopolymer, and 7860 g. of a 34.1% latex of a copolymer of 70 parts of α-methylstyrene and 30 parts of acrylonitrile with a K-value of 60.0, are mixed with 2995 g. of the 33.4% latex of the graft polymer (graft polymer component C) of 14 parts of styrene and 6 parts of acrylonitrile on 80 parts of the copolymer of 50% of butadiene and 50% of ethylacrylate, and 667 g. of the 30% emulsion of the linear polypropylene glycol with an average degree of polymerisation of 37±2 and an OH-number of 56±3. The weight ratio of graft polymer A:resin:graft polymer C:polyether is thus 8:67:25:5. After rolling, granulation and injection-moulding, the moulding composition thus obtained shows the electrical data set out in Table 5.

EXAMPLE 13

2350 g. of a 28.9% latex of a graft polymer (graft polymer component A) of 36 parts of styrene and 14 parts of acrylonitrile on 50 parts of a copolymer of 90% of butadiene and 10% of styrene, and 6100 g. of the 42.6% latex of the copolymer of 72 parts of styrene and 28 parts of acrylonitrile are mixed with 2105 g. of a 34.2% latex of a graft polymer (graft polymer component C) of 14 parts of styrene and 6 parts of acrylonitrile on 80 parts of a copolymer of 30% of butadiene and 70% of butyl acrylate, and 667 g. of the 30% emulsion of the linear polypropylene glycol with an average degree of polymerisation of 37±2 and an OH-number of 56±3. The weight ratio of graft polymer A:resin:graft polymer C:polyether is thus 17:65:18:5. The polymer-polyether mixture is worked up and further processed as already described. The circular discs were found to exhibit the electrical data set out in Table 5.

TABLE 5

| | Graft polymer A | Co-polymer | Graft polymer C | Poly-ether | Surface resistance, Ω | Friction partner polycaprolactam Limiting charge, V. cm.$^{-1}$ | Friction partner polycaprolactam Half-life, secs. | Friction partner polyacrylonitrile Limiting charge, V. cm.$^{-1}$ | Friction partner polyacrylonitrile Half-life, secs. |
|---|---|---|---|---|---|---|---|---|---|
| Example 12 | 8 | 67 | 25 | 5 | 4.10$^{12}$ | +410 | 9 | +650 | 18 |
| Example 13 | 17 | 65 | 18 | 5 | 6.10$^{12}$ | +270 | 8 | +740 | 59 |

What is claimed is:
1. An antistatic moulding composition comprising
(A) 5 to 98% by weight of a graft copolymer prepared by the graft polymerization of 10 to 95% by weight of a mixture of
 (a) 50 to 90% by weight of styrene, an alkyl derivative thereof or a mixture thereof and 50 to 10% by weight of acrylonitrile, an alkyl derivative thereof or a mixture thereof on
 (b) 90 to 5% by weight of a polymer of a conjugated diolefin containing at least 80% by weight of polymerized diolefin and at most 20% by weight of polymerized styrene, acrylonitrile, an alkyl derivative thereof or a mixture thereof;
(B) 0 to 93% by weight of a thermoplastic copolymer of
 (a) 50 to 95% by weight of styrene, an alkyl derivative thereof or a mixture thereof and
 (b) 50 to 5% by weight of acrylonitrile, an alkyl derivative thereof or a mixture thereof;
(C) 1 to 35% by weight of a graft polymer prepared by the graft polymerization of 10 to 90% by weight of a mixture of
 (a) 50 to 90% by weight of styrene, an alkyl derivative thereof or a mixture thereof and 50 to 10% by weight of acrylonitrile, an alkyl derivative thereof or a mixture thereof on
 (b) 90 to 10% by weight of a copolymer of 90 to 5% by weight of a conjugated diolefin and 10 to 95% by weight of an ester of an ethylenically unsaturated carboxylic acid with an aliphatic alcohol of 1–10 carbon atoms and
(D) 1 to 10% by weight of a polypropylene glycol whose degree of polymerization is from 10 to 1000 and whose terminal hydroxyl groups may be completely or partially etherified with an aliphatic alcohol containing 1 to 20 carbon atoms or completely or partially esterified with an aliphatic carboxylic acid containing 1 to 18 carbon atoms, the total amount of styrene and acrylonitrile or their alkyl derivatives in components (A), (B) and (C) being at least 50% by weight.

2. The antistatic moulding composition of claim 1 wherein the graft base of component (C) is a copolymer of 85 to 15% by weight of said conjugated diolefin and 15 to 85% by weight of said ester of said ethylenically unsaturated carboxylic acid.

3. The antistatic moulding composition of claim 1 wherein the degree of polymerization of said polypropylene glycol is from 10 to 200.

4. The antistatic moulding composition of claim 1 wherein the graft base of component (A) is polybutadiene.

5. The antistatic moulding composition of claim 1 wherein the graft base of component (A) is a copolymer of butadiene and styrene.

6. The antistatic moulding composition of claim 1 wherein the graft base of component (C) is 90 to 5% by weight of butadiene and 10 to 95% by weight of an ester of acrylic acid, methacrylic acid or fumaric acid or a mixture thereof with an aliphatic alcohol of 1–10 carbon atoms.

(References on following page)

References Cited

UNITED STATES PATENTS 3,354,108  11/1967  Paradis et al. _____ 260—876 XR

FOREIGN PATENTS 1,410,262  8/1965  France.

SAMUEL H. BLECH, Primary Examiner

C. J. SECCURO, Assistant Examiner

U.S. Cl. X.R.

260—23.7, 31.4, 33.2, 898